Patented May 29, 1934

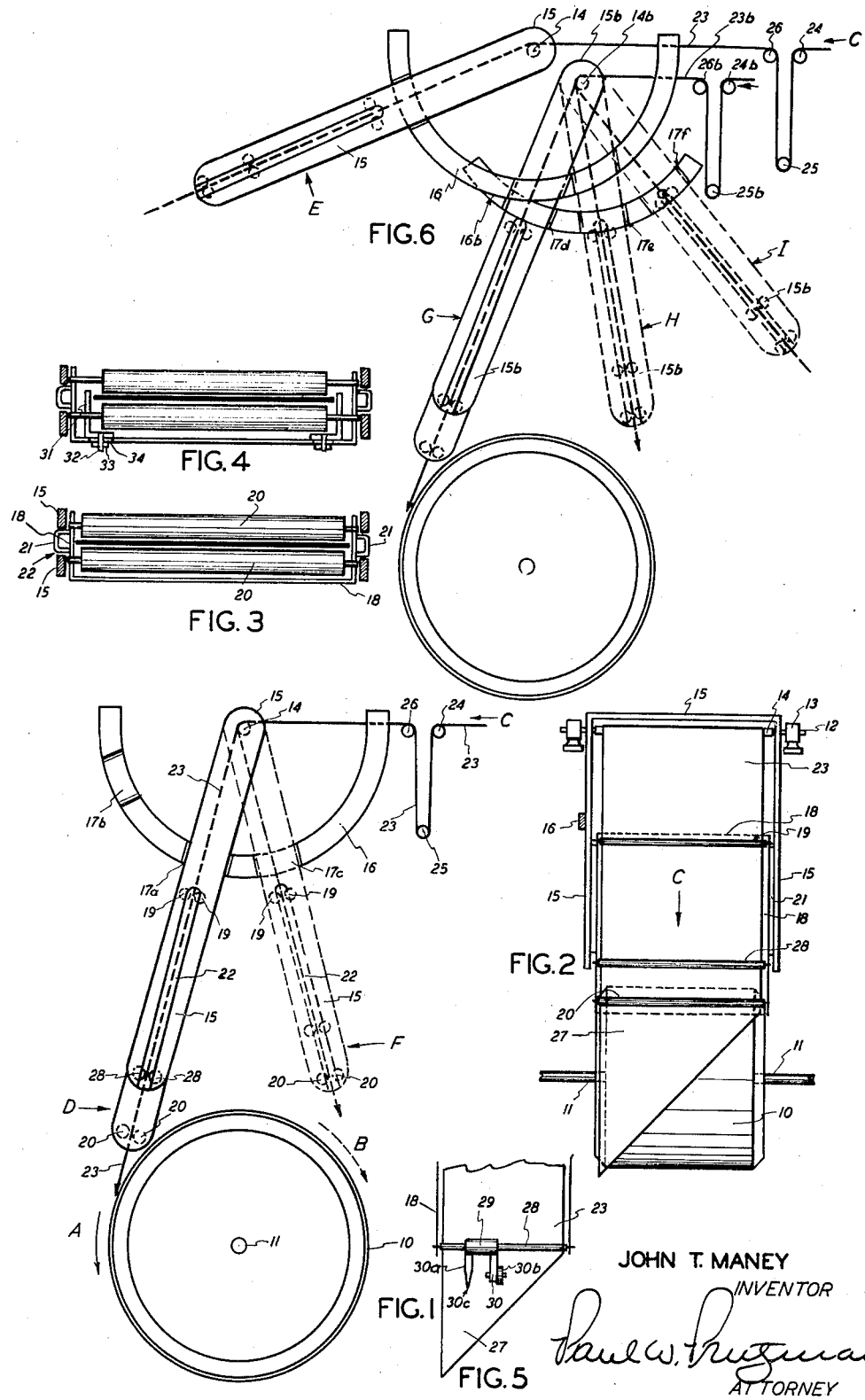

1,960,822

UNITED STATES PATENT OFFICE 1,960,822

METHOD AND APPARATUS FOR MAKING TIRES

John T. Maney, Los Angeles, Calif., assignor to Vernon Tool Company, Ltd., Los Angeles, Calif.

Application May 4, 1932, Serial No. 609,127

13 Claims. (Cl. 154—10)

In building pneumatic tire casings it is current practice to construct the carcass by what is termed the flat band, pulley band or drum method. In the practice of this method, strips of bias-cut ply fabric are wound around a drum or core which is capable of rotation in either direction, the strips being drawn from supplies maintained on ply liner rolls or in a feeding ply pan, ply compensator or other suitable supply means.

The ply fabric, as is well known, consists of a weave of cotton cords, the cords forming the warp of the fabric being heavy and strong, adapted to form a wear resisting and pressure restraining carcass, while the woof cords are little more than threads, adapted to retain the warp cords in spaced relation and to form a fabric which may be handled. This fabric is saturated and coated with soft, uncured rubber and is cut into strips on the bias; so that the heavy cords lie at some predetermined and preferred angle to the edge of the strip. When these bias strips are formed into a carcass by winding them circumferentially around a drum or core, the cords intersect the plane of revolution of the carcass at this same angle, whatever it may be.

As the warp cords alone have pressure restraining strength, the carcass is built up by applying a plurality of plies in which the direction of the bias angle to the revolution plane is alternately reversed.

Because of the bias cut, the strips are readily extended in length and correspondingly diminished in width if forcibly pulled endwise and must be handled with great care to avoid warping, wrinkling, and self-adhesion. The ply strips, which are customarily joined at their ends to form a continuous band, are therefore fed to the hand of the drum operator by means of an elaborate system of feed rolls and compensators, the sole object of which is to permit the operator to wind single layers of the ply fabric on the drum and to tear them off at the proper length without imposing any avoidable strain on the fabric in so doing.

In the current practice of this method it is customary to wind the fabric onto the drum in one direction only, the operator drawing on one supply source for one complete wrap or ply, and for the next on another supply source, these two supplies having the heavy or warp cords inclined in opposite directions. Each of these supply sources includes a pair of stock feed rolls or pans, a compensator, two or more synchronized motors with automatic switches to actuate and control the compensator, and a final feed pan held in a fixed position adjacent the tire building drum. This feed pan, because of its fixed position and the necessity for duplication, must be located at some little distance from the drum, leaving a long free end dangling from the pan to interfere with the handling of the next ply and to distort by its own weight. Because of this necessary distance, the pan does not act as a guide in placing the ply strip on the drum and the strip must be manipulated into place by hand, requiring the useless expenditure of time and the provision of excess width to allow for inaccurate placing.

My invention is an improvement over the art just described in the following features, each of which I believe to be of considerable value.

First, it provides a method of and means for applying a single strip of ply fabric in the form of successive plies in which the warp threads alternate in direction, thus requiring only a single fabric supply means and doing away with the necessity for one-half of the complicated and expensive supply apparatus above described. Second, it provides means for delivering the fabric at a point close to the surface of the drum, thus avoiding any unsupported length of fabric and the wrinkling and distortion to which a long free end is subject. Third, by using a single strip of fabric for alternate layers, the interference of the end of the strip which is not in use with the application of the next layer is avoided. Fourth, it provides means for moving one delivery guide out of the way of the operator and for bringing another into the position previously occupied by the first, in those cases (such as the building of six ply tires) in which strips of different widths are used, all without placing the fabric under strain or withdrawing its support. Fifth, it provides means for accurately guiding the fabric onto the drum and preventing side movement, thus avoiding tedious manual placement and the necessity for excess width.

These and other objects and advantages of my invention may readily be seen on inspection of the attached drawing and the following description thereof, in which Fig. 1 illustrates a complete assembly, in side elevation, of the device as adapted to handle a single ply strip in placing plies of alternate bias;

Fig. 2 is an elevation of the front or left side of Fig. 1;

Fig. 3 is an end elevation of the delivery guide indicated at 18 in Fig. 2;

Fig. 4 is an end elevation of a modified form of delivery guide having movable sides to accommodate strips of different widths;

Fig. 5 is an end elevation of the clutch rollers 28—28 of Figs. 1 and 2, and

Fig. 6 is a side elevation, similar to Fig. 1, of a duplicated device adapted to handle two ply strips of different widths or composition.

Referring to the drawing, 10 is a tire-making drum or form of any preferred type, adapted to be revolved about the shaft 11 in either direction at will, as indicated by the arrows A and B in Fig. 1. Many such drums are known and are no part of my present invention, which is equally adapted to all of them as well as to laterally rounded cores.

Above the drum and in a position parallel to its axis of revolution I support a shaft 12 as by bearings 13 attached to any convenient overhead member, not shown. On this shaft or parallel thereto I place a small idler roller 14, which should be of the least possible weight and should be mounted on frictionless bearings. These remarks as to weight and friction apply to other rollers later mentioned and need not be repeated, it being obvious that rollers over which the fabric passes should offer the least possible resistance to its free movement.

On the shaft 12, but quite independently of the roller, I suspend an inverted U-frame 15. This frame may be of relatively light material, so as to be readily swung on the shaft by hand, but should be sufficiently stiff to cause its two downwardly extending ends to move in unison. At one side of this frame, as at 16, I place a resilient quadrant having shallow notches 17a—17c so placed as to hold the frame in the desired positions later described, the quadrant being sufficiently resilient to spring away from the frame when the latter is pulled in either direction against the sloping edge of the notch. This device, which is of importance so far as its function is concerned, has many obvious mechanical equivalents.

The arms of the frame should be of such length that when they are swung across the top of the drum, in the operation later described, they will safely clear not only the drum but also any thickness of plies which may have been placed on it.

Between the arms of the frame I place a delivery guide 18, this guide having side and bottom but no end closures. Close to the ends of the guide, and optionally at intermediate points, I place pairs of light rollers as indicated at 19—19 and 20—20, the rollers of each pair being so spaced as to act merely as a support for the fabric without exerting any compressive force. It is advantageous to provide several pairs of rollers between 19—19 and 20—20.

The guide 18 is provided with projecting side lugs 21—21 which ride in slots 22 in the arms of the frame, permitting a limited longitudinal movement of the guide and its rollers within the frame. The weight of the guide may desirably be counterbalanced, or the lugs may be frictionally fitted within the slots so as to retain the guide in any longitudinal position in which it may be placed by hand.

A band or strip of ply fabric is indicated at 23—23, this fabric being fed as required from any source of supply such as that already described. This supply apparatus, being no part of my invention, is not shown, and the strip is shown as entering the apparatus to which I lay claim in the direction indicated by the arrow C. From this point the strip should preferably pass over two idler rollers 24 and 26, supported in a fixed position in any convenient manner, and beneath a floating roller 25 which is supported only by the fabric and acts as a slack take-up to permit intermittent forward movement of the remainder of the strip. From this take-up the fabric passes over the roller 14 and between the pairs of rollers 19—19 and 20—20, the free end of the strip finally projecting below the lowermost rollers as indicated at 27, where the strip is shown as torn off on the bias.

In Figs. 4 and 5 are shown two desirable modifications of the structure of the delivery guide 18. Referring to Fig. 4, the pan 18 is provided with L-shaped strips 31—31 which are held against the bottom of the pan by studs 32 and nuts 33, the studs sliding laterally in the slots 34. These strips constitute false sides for the pan in which the rollers are mounted, and may be adjusted to different distances apart to guide strips of different widths.

Referring to Fig. 5, 28 is a shaft or rod extending across the guide and carrying a sleeve 29 having two projecting arms 30 and 30a. At the end of projection 30 is mounted a roller 30b. When the strip of fabric is released by the operator after tearing away from the ply already laid, it moves back or upwardly in the guide under the influence of slack take-up roller 25 as shown in Fig. 1. When the strip has retracted far enough to clear roller 30b, the arm 30 drops, carrying with it the arm 30a, and the pointed end 30c of this arm engages the still-projecting end of the strip, thereby preventing it from retracting beyond the operator's reach.

The operation of this apparatus is as follows. The operator, standing in front of the drum or at the left as referred to Fig. 1, swings the frame inwardly until it engages notch 17a and draws the guide 18 (and the end of the strip) downwardly until the assembly occupies the position shown at D in Fig. 1. He then places the end of the strip in contact with the drum and turns the drum through one revolution in the direction indicated by arrow A.

The drum now having one wrap or ply of fabric, he tears off the strip to the proper length, runs the guide upward in the slide, and performs such operations on the ply as may be required. If the frame and pan in position D (but with the pan moved upwardly to its limit) should interfere with these operations, he may swing the frame from notch 17a to notch 17b, when it will occupy the position shown at E in Fig. 6 and be entirely out of the way.

When ready to put another ply in place, the operator swings the frame into notch 17c, when it will occupy the position indicated in dotted lines at F in Fig. 1. He then again moves the pan downwardly within the frame, attaches the end of the fabric to the face of the ply already placed, rotates the drum through one revolution in the direction indicated by the arrow B, tears off the fabric and performs such operations on the second ply as may be necessary. He then brings the frame back to position D for placing the third ply, and so continues until a sufficient number of plies have been placed.

As the direction of the cords in regard to the plane of rotation is reversed by winding the strip on the drum in opposite directions, a single strip of fabric thus serves to build up a carcass having the ply cords in alternately opposed directions by a mere alternation of underhand and overhand rotations of the drum. It is thus unnecessary to provide more than one source of supply if the carcass is constructed of one width and character of strip. If the carcass requires more than one width and/or character of fabric strip, it is necessary to provide two or more delivery assemblies, each as above described. Fig. 6 illustrates a manner in which two such assemblies may be mounted, and as each of these assemblies is identical with that shown in Fig. 1, they need not be described as to details. The frame, which in Fig. 1 is indicated as 15 is duplicated at 15b in Fig. 6 and all other duplicated parts are likewise indicated in the latter figure.

It will be noted that frame 15 may be placed in the two positions D and F shown in Fig. 1 while in use, and may then be withdrawn to the position E of Fig. 6 while frame 15b is brought into action. This frame may assume the positions G and H while in use and may then be moved back into position I when it again becomes necessary to use frame 15. A separate quadrant 16b having notches 17d—17e and 17f, is provided to retain frame 15b in these three positions.

It is a material advantage of my method of laying the plies from a single source that the angle of the cords to the plane of revolution is maintained constant as to magnitude while reversed in direction, thus producing a more uniform and better balanced tire than can be made when there is any material variation in the magnitude of the alternate angles. This uniformity of angle is practically impossible to maintain when the alternate plies are drawn from separate sources, in which the strains which tend to distort the fabric and alter the angle of the cords can seldom or never be made completely uniform.

In the device above described the sides of the guide 18 act to direct the strip truly onto the drum. The longitudinal movability of the pan, while not essential to the successful practice of my invention of winding in alternate directions, is desirable as bringing the end of the guide materially closer to the face of the drum and in similarly approaching the fabric supporting rollers to the drum and avoiding a long free end.

While I have described a preferred form of my apparatus in such detail as to make its workings clearly apparent, I would have it understood that this form is illustrative only and that numerous variations may be made without departing in the least degree from the spirit of my invention, the scope of which is limited solely by the following claims.

I claim as my invention:

1. A method of building tire carcasses which comprises: placing on a suitable tire-making form a ply of bias-cut ply fabric by revolving said form in one direction and guiding said fabric onto said form from a laterally immovable support terminating immediately adjacent the revolving face of said form; severing said ply from said strip; reversing the circumferential position of said support as related to said form; attaching the free end of said strip to the ply already in place; revolving said form in the opposite direction to said first direction to place a second ply, and severing said second ply from said strip; the two plies so placed having their cords inclined at equal angles to the plane of revolution of said form but in opposite directions.

2. A method of building tire carcasses which comprises: feeding a strip of bias-cut ply fabric to a delivery guide swingingly supported over a suitable tire-making form and axially aligned therewith; moving said delivery guide to substantial alignment with one face of said form, and winding on said form a ply of fabric drawn from said guide by revolving said form through one revolution; severing said ply from said strip; moving said delivery guide to substantial alignment with the opposite face of said form, and winding on said form another ply of fabric drawn from said guide by revolving said form through one revolution in a direction opposite to that of said first revolution.

3. Tire-making apparatus including, in combination with a revolvable tire-making form and a source of supply of bias-cut ply fabric in strip form: a frame swingingly supported at points distant from said form and axially aligned therewith, and a fabric delivery guide slidably mounted in said frame adjacent the swinging end thereof, said frame being so supported as to permit said guide to be swung to substantial alignment with circumferentially opposed faces of said form.

4. Apparatus as in claim 3, in which said guide is longitudinally movable to extend beyond the swinging end of said frame.

5. Apparatus as in claim 3, including means for temporarily retaining said frame and guide in substantial alignment with either circumferential face of said form.

6. Apparatus as in claim 3, including means for swinging the free end of said frame together with said guide to a position materially distant from said form, and for temporarily retaining said frame and guide in said position.

7. Apparatus as in claim 3, including means for temporarily retaining said frame and guide in positions respectively adjacent to and distant from said form, said means comprising: a laterally resilient quadrant contacting a side member of said frame, and notches formed in said quadrant adapted to receive said side member.

8. Apparatus as in claim 3, in which said guide is provided with friction reducing rollers for supporting said fabric as it is wound on said form.

9. Apparatus as in claim 3, in which the guide is provided with side pieces arranged to direct said fabric strip onto said form.

10. Apparatus as in claim 3, in which the guide is provided with laterally adjustable side pieces arranged to direct strips of various widths onto said form.

11. Apparatus as in claim 3, including a slack take-up adapted to prevent said fabric from wrinkling, said take-up comprising: a pair of spaced idler rolls aligned with the supports of said frame and positioned to support said fabric in its passage toward said frame, and a roller situated in a downwardly directed loop in said fabric between said idler rolls, said roller being free to rise and fall as said loop is momentarily decreased and increased in length.

12. Apparatus as in claim 3, including means for preventing said fabric strip from backing out of said guide, said means comprising: a pair of rollers within said guide, said rollers arranged for light pressural contact with said strip, one of said rollers being provided with clutch means permitting said roller to revolve in the direction of advance of said strip and preventing said roller from revolving in the direction of retraction of said strip.

13. Tire-making apparatus including, in combination with a single revolvable tire-making form and a plurality of sources of supply of bias-cut ply fabric in strip form: a plurality of frames swingingly supported on separated axes, said axes being aligned with each other and with the axis of revolution of said form, each said frame having a fabric delivery guide mounted adjacent its swinging end; said frames being so mounted as to permit independent movement of said guides into and out of proximity to the circumferential face of said form and to any other of said guides.

JOHN T. MANEY.